(12) United States Patent
Mizuno

(10) Patent No.: US 6,996,607 B2
(45) Date of Patent: Feb. 7, 2006

(54) STORAGE SUBSYSTEM AND METHOD EMPLOYING LOAD BALANCING

(75) Inventor: Makio Mizuno, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/893,220

(22) Filed: Jul. 19, 2004

(65) Prior Publication Data

US 2005/0004998 A1    Jan. 6, 2005

Related U.S. Application Data

(63) Continuation of application No. 10/023,881, filed on Dec. 21, 2001, now Pat. No. 6,785,715.

(30) Foreign Application Priority Data

Jul. 18, 2001   (JP)   ............................ 2001-217641

(51) Int. Cl.
    G06F 15/167   (2006.01)
    G06F 15/173   (2006.01)
    G06F 15/16    (2006.01)
    G06F 12/00    (2006.01)

(52) U.S. Cl. ...................... 709/214; 709/238; 709/245; 711/2; 711/5; 711/154

(58) Field of Classification Search ................ 709/201, 709/203, 213, 216, 219, 230, 238, 240, 214, 709/245; 711/2, 5, 154
    See application file for complete search history.

(56) References Cited

U.S. PATENT DOCUMENTS

| 4,602,329 | A   | * | 7/1986  | Ohtake ......................... 712/38 |
| 4,796,176 | A   |   | 1/1989  | D'Amico et al. |
| 5,841,990 | A   |   | 11/1998 | Picazo, Jr. et al. |
| 5,848,241 | A   | * | 12/1998 | Misinai et al. .............. 709/213 |
| 6,295,276 | B1  | * | 9/2001  | Datta et al. ................. 370/218 |
| 6,333,931 | B1  |   | 12/2001 | La Pier et al. |
| 6,351,775 | B1  |   | 2/2002  | Yu |
| 6,370,381 | B1  | * | 4/2002  | Minnick et al. ............ 455/445 |
| 6,370,584 | B1  | * | 4/2002  | Bestavros et al. .......... 709/238 |

(Continued)

Primary Examiner—Ario Etienne
Assistant Examiner—El Hadji M. Sall
(74) Attorney, Agent, or Firm—Reed Smith LLP; Stanley P. Fisher, Esq.; Juan Carlos A. Marquez, Esq.

(57) ABSTRACT

A storage subsystem that directly interfaces with a network, provides connections for routers with a conventional multi-path function, and performs access load balancing among a plurality of input/output ports. Each channel controller is assigned with a channel controller network address, and a storage device is assigned with a storage device address (different from the network addresses of the channel controllers). Upon receiving a packet addressed to the storage device address from an external network device, a pseudo storage load routing function responds by notifying the external network device that the packet has been transmitted to the storage device with the storage device address, while performing input/output processing indicated by the packet for the storage device with the storage device address.

8 Claims, 9 Drawing Sheets

U.S. PATENT DOCUMENTS

| | | | |
|---|---|---|---|
| 6,393,535 B1 * | 5/2002 | Burton et al. | 711/158 |
| 6,412,079 B1 * | 6/2002 | Edmonds et al. | 714/11 |
| 6,493,341 B1 | 12/2002 | Datta et al. | |
| 6,535,954 B2 | 3/2003 | Obara et al. | |
| 6,542,933 B1 | 4/2003 | Durst, Jr. et al. | |
| 6,601,128 B1 * | 7/2003 | Burton et al. | 710/316 |
| 6,691,165 B1 * | 2/2004 | Bruck et al. | 709/227 |
| 6,738,881 B1 * | 5/2004 | Ollivier et al. | 711/168 |
| 6,745,281 B1 * | 6/2004 | Saegusa | 711/112 |
| 6,772,270 B1 * | 8/2004 | Kurpanek | 710/316 |
| 6,807,581 B1 * | 10/2004 | Starr et al. | 709/250 |
| 6,912,627 B2 * | 6/2005 | Matsunami et al. | 711/154 |
| 6,944,731 B2 * | 9/2005 | Bouchard et al. | 711/161 |

* cited by examiner

FIG. 3

ADDRESS MANAGEMENT TABLE

| THE STORAGE DEVICE IP ADDRESS (610) | THE STORAGE DEVICE MAC ADDRESS (620) | STATE OF PSEUDO ROUTER FUNCTION (630) |
|---|---|---|
| 172.16.0.1 | 00:11:22:33:44:55 | ON |

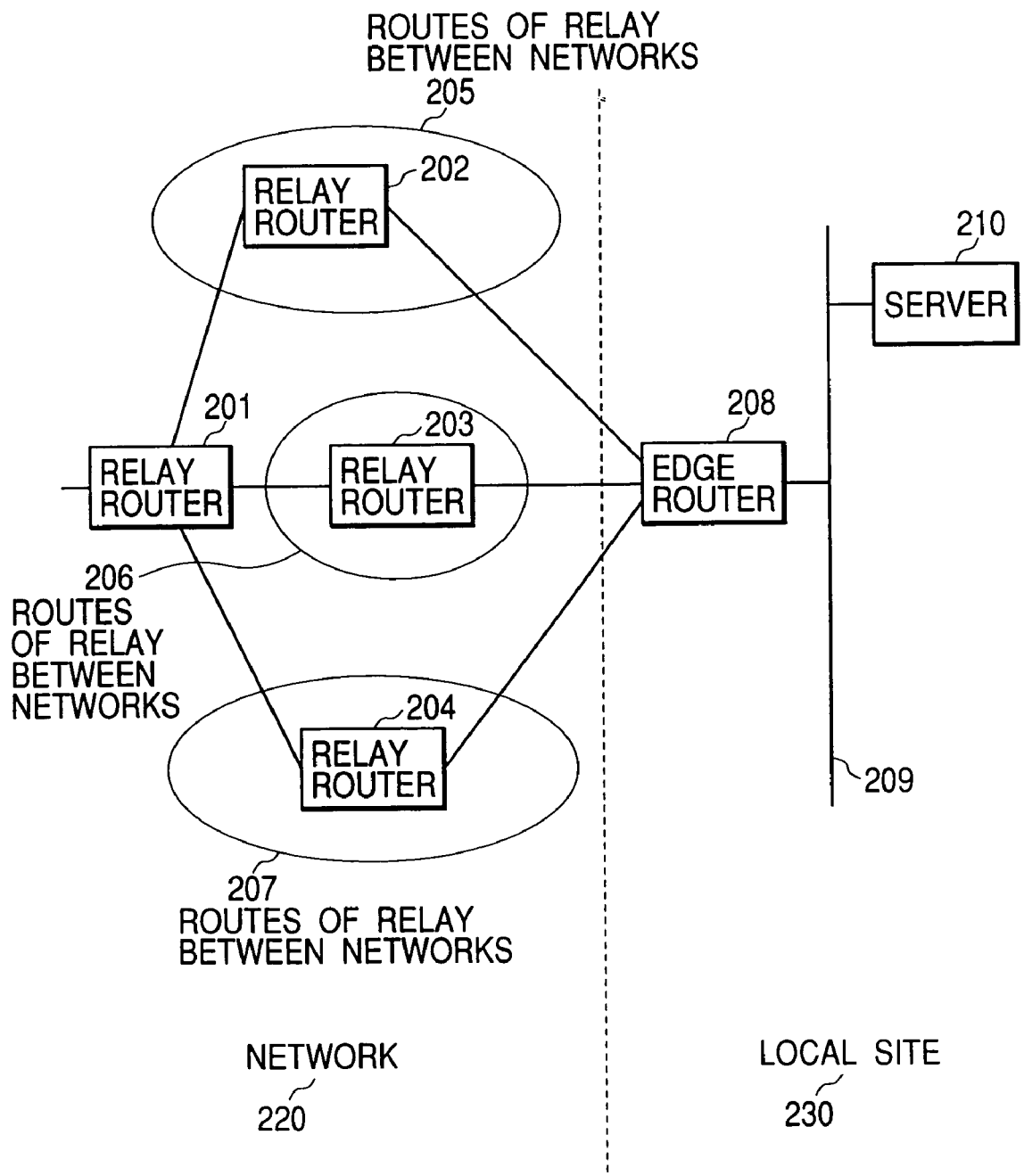

ROUTING TABLE

ROUTING TABLE

STORAGE SUBSYSTEM AND METHOD EMPLOYING LOAD BALANCING

CROSS REFERENCE TO RELATED APPLICATIONS

This application is a Continuation application of U.S. application Ser. No. 10/023,881 filed on Dec. 21, 2001 now U.S. Pat. No. 6,785,715. Priority is claimed based on U.S. application Ser. No. 10/023,881 filed on Dec. 21, 2001, which claims priority to Japanese Patent Application No. 2001-217641 filed on Jul. 18, 2001.

BACKGROUND OF THE INVENTION

1. Field of the Invention

This invention relates to a storage subsystem, more particularly to a storage subsystem providing interfaces with an external network through a plurality of input/output ports and connectable to existing routers and other equipment without requiring any alterations at the external end thereof, that expands processing capability by distributing network packet traffic among the input/output ports so as to avoid load concentration.

2. Description of Related Art

In recent years, the explosive proliferation of the Internet and the emergence of gigabit Ethernet are enhancing network infrastructure, speed, and bandwidth. In addition, since a network using the Internet Protocol (IP) ("an IP network" hereinafter) has the advantages of low management and operating costs and higher interconnectivity than typically seen in Local Area Networks (LANs), the concept of a Storage Area Network (SAN) has emerged. A SAN refers to a network environment for storage-only devices, in which one or more host computers and one or more storage devices are linked together. The storage devices may include a disk array subsystem (hereinafter "a storage subsystem").

The typical structure of a storage subsystem is described below with reference to FIG. 7.

FIG. 7 is a block diagram of a typical storage subsystem.

The storage subsystem 100 comprises a channel controller 105, a disk access controller 120, a coupled unit 110, and a storage (device 130, and the coupled unit 1 10 includes a memory controller 140.

The channel controller 105 receives an access request from a host computer, analyzes the access request and performs other processing. The disk access controller 120 controls the channel controller 105's access to the storage device 130.

The coupled unit 110 provides coupling between the channel controller 105 and the disk access controller 120. The memory controller 140 stores the control information about data transmission between the channel controller 105 and the disk access controller 120, and stores data that a host computer reads from and writes to the storage device 130.

The storage device 130 comprises hard disk devices that store a large amount of data.

As the network speed and bandwidth increase, increasing access requests from host computers arrive, which places mounting loads on the storage device. Due to this background, technology for balancing storage device loads has been proposed. For example, JP-A-330924/2000 discloses a method for a host computer side to detect routes of access to a target storage device, and to balance the load on the storage device among the routes of access.

However, the prior art described above balances load by having the host computer provide a unique number identifying the target storage device. Therefore, there is a problem in that the host computer requires an additional means for providing unique numbers for storage devices so as to lack expandability.

In general, servers and other equipment on an Ethernet network have network addresses known as Internet Protocol (IP) addresses and Media Access Control (MAC) addresses, so they do not require the additional means mentioned above router distributes the access load with these network addresses. Typical functions of a router include a routing function by which a route of transmission to a destination IP network address is found. Protocols supporting the routing function include the Route Information Protocol (RIP), and the Open Shortest Path First (OSPF).

Extensions of the routing function using protocols, such as RIP and OSPF, includes a function ("a multi-path function" hereinafter) for performing load balancing among a plurality of routes of transmission to a destination IP address thereby using alternative routes when a failure occurs on one of the routes.

The multi-path function is described briefly with reference to FIG. 8 and FIG. 9.

FIG. 8 is a drawing showing an example of a network structure having a plurality of network relay routes.

FIG. 9 is a drawing showing routing tables and a table of information of a multi-path of a router.

In the network structure shown in FIG. 8, routes of access from a relay router 201 in a network 220 to a server 210 within a local site 230 include three routes of relay between networks 205, 206, and 207.

Within the local site 230, since there is an edge router 208 with only one route to the server 210, the question in this case concerns the routes between the relay router 201 and the edge router 208.

In the example shown in FIG. 8, since there are three routes of access between the relay router 201 and the edge router 208, the server 210 can be accessed through any of the routes of relay between networks 205, 206, and 207.

In order to describe the multi-path function, a routing table for a conventional routing function, shown in FIG. 9(a), is described The main elements of the routing table are a destination address 301 that gives a destination IP address, a subnet mask 302 that gives mask information for identifying the network including the address given by the destination address 301, a next hop address 303 that gives the IP address of the next relay router, and an output interface 304 that indicates which output port in the router is linked to the next relay router.

FIG. 9(b) shows a routing table used when there are a plurality of next hop routers, or a plurality of routes of access. In the routing table in FIG. 9(b), although the destination address 301 and subnet mask 302 are the same as in FIG. 9(a), a plurality of next hop addresses are registered as information of multi-path 310. The information of multi-path 310 includes information about the routes concerned (route 1, route 2, and route 3) and the output interfaces (output interface A, output interface B, and output interface C) (311, 312, and 313). If there are a plurality of routes to an address given by the destination address 301, the output port is selected from the routes that have been registered in the information of multi-path 310. The multi-path function accordingly implements access load balancing by using a plurality of routes of access without requiring additional means at the host computer.

However, there is a restriction that the multi-path function and routing protocols are applicable only when there are a plurality of routes of access to a single IP address. That is, even if there are a plurality of routes, the target network device must be treated as a single device.

If a storage subsystem having a plurality of input/output ports is used in an IP network, each of the input/output ports has an IP address and a MAC address. Therefore, a plurality of IP addresses and MAC addresses exist in the storage subsystem, presenting a problem that makes it impossible to use the multi-path function.

If the multi-path function is not used, users external to the network must communicate with the input/output ports by using their IP addresses and MAC addresses or must add additional equipment for load balancing.

SUMMARY OF THE INVENTION

An object of the present invention is to provide a storage subsystem having a plurality of input/output ports, that enables access on the storage subsystem and to balance the load over the plurality of input/output ports without requiring additional means in the external network environment or a host computer, and to establish connections with networks easily using the functions of currently available network equipment.

To attain this object, the present invention implements load balancing and expands processing capability by making the channel controllers within a storage subsystem having a plurality of input/output ports behave as virtual routers on the routes to a virtual destination IP address, which is assigned to a storage device within the storage subsystem to take advantage of the conventional multi-path function of existing routers. Alternatively, the present invention assigns IP addresses to individual units (e.g. individual volumes or individual storage devices) to implement access load balancing within those individual units. Furthermore, the invention addresses requests for network bandwidth from customers with the storage subsystem, which is adopted to handle accessing peak times, by updating the address management tables of channel controllers.

This invention therefore provides a storage subsystem that balances access loads on the storage subsystem at the plurality of input/output ports without additional means in the external network environment or a host computer. At the same time, the storage subsystem interfaces with a network by using the functions of currently available network equipment.

Other and further objects, features and advantages of the invention will appear more fully from the following description.

BRIEF DESCRIPTION OF THE DRAWINGS

The preferred embodiments of the present invention are illustrated in the accompanying drawings in which:

FIG. 3 is a diagram of an address management table;

FIG. 8 is a drawing showing an example of a network structure having a plurality of network relay routes.

DETAILED DESCRIPTION OF THE PREFERRED EMBODIMENTS

Preferred embodiments of the present invention are described below with reference to FIG. 1 to FIG. 6

First Embodiment

The first embodiment of the present invention is described with reference to FIG. 1 to FIG. 4.

First, the structure of a storage subsystem according to the first embodiment of the present invention is described with reference to FIG. 1.

Figure 1:
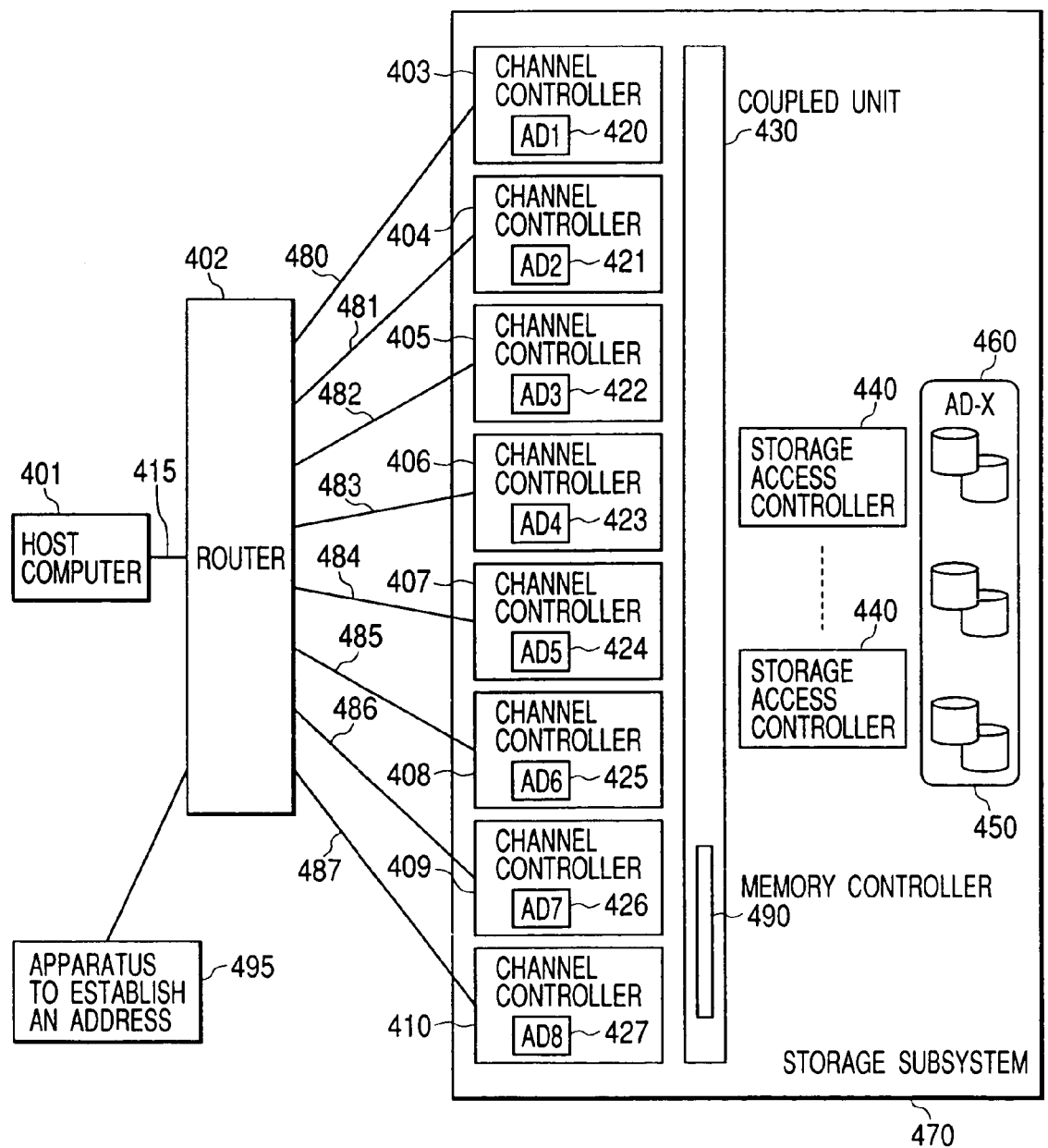
FIG. 1 is a block diagram of a storage subsystem of a first embodiment of the present invention.

FIG. 1 is a block diagram of the storage subsystem of the first embodiment of the invention.

The host computer 401 is connected to a network and sends access request packets to the storage subsystem 470. The router 402 has a function of routing packets on the network and thereby couples the storage subsystem 470 and the host computer 401. The path 415 between the host computer 401 and the router 402 may include another network.

The channel controllers 403 to 410 receive access request packets from the router, perform protocol processing, including packet analysis, and issue requests for access to the storage device 450 via the disk access controller 440. The channel controllers 403 to 410 are assigned unique addresses 420 to 427 (AD1, AD2, AD3, AD4, AD5, AD6, AD7, and AD8) respectively. Each channel controller address (AD) includes an IP address and a MAC address. For example, channel controller 406 is assigned IP4 and MAC4 as its unique address.

The coupled unit 430 is implemented by a crossbar switch or the like, and it has a mechanism for coupling each channel controller to the storage access controller 440. Each channel controller can issue an access command to any storage access controllers 440 via the coupled unit 430.

The memory controller 490 has a memory for storing access data from clients and control information about accesses between the channel controllers 403–410 and the storage access controllers 440.

The storage access controller 440 controls access to the storage device 450. The storage device 450 stores data from clients, and usually comprises large-capacity hard storage drives.

The storage device 450 is assigned with a storage device address AD-X.

Figure 4:
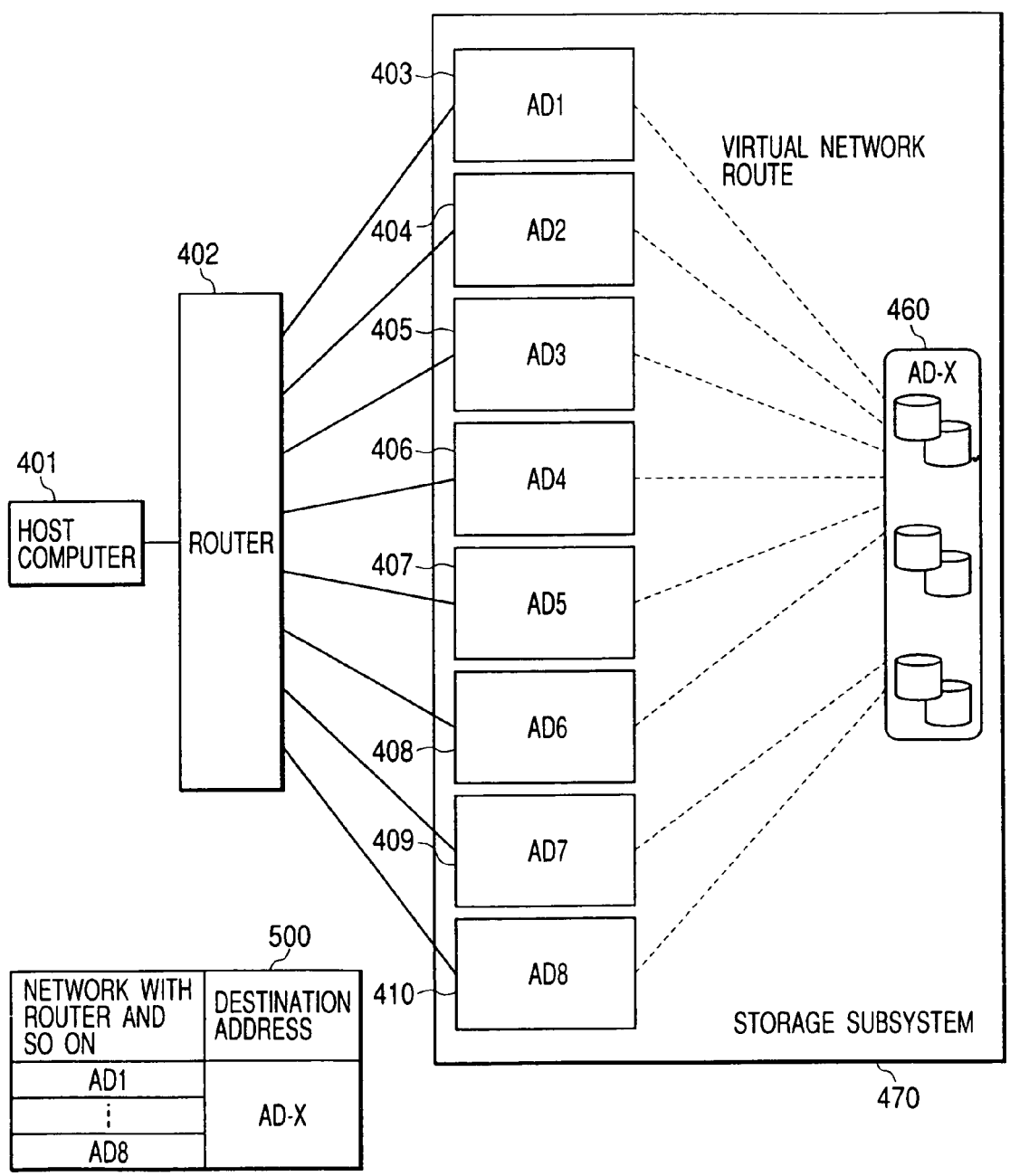
FIG. 4 is a conceptual diagram describing communication operations in the storage subsystem of the first embodiment of the invention.

The router 402 and the storage subsystem 470 are interconnected via paths 480 to 487 and exchange packets through the input/output ports of the channel controllers 403 to 410. The example in FIG. 4 shows eight input/output ports, but the invention is not limited to any specific number of input/output ports.

The apparatus for establishing an address 495 may be an external console, which establishes addresses for the channel controllers 403 to 410 and the storage device 450.

Next, the structure of a channel controller is described with reference to FIG. 2 and FIG. 3.

Figure 2:
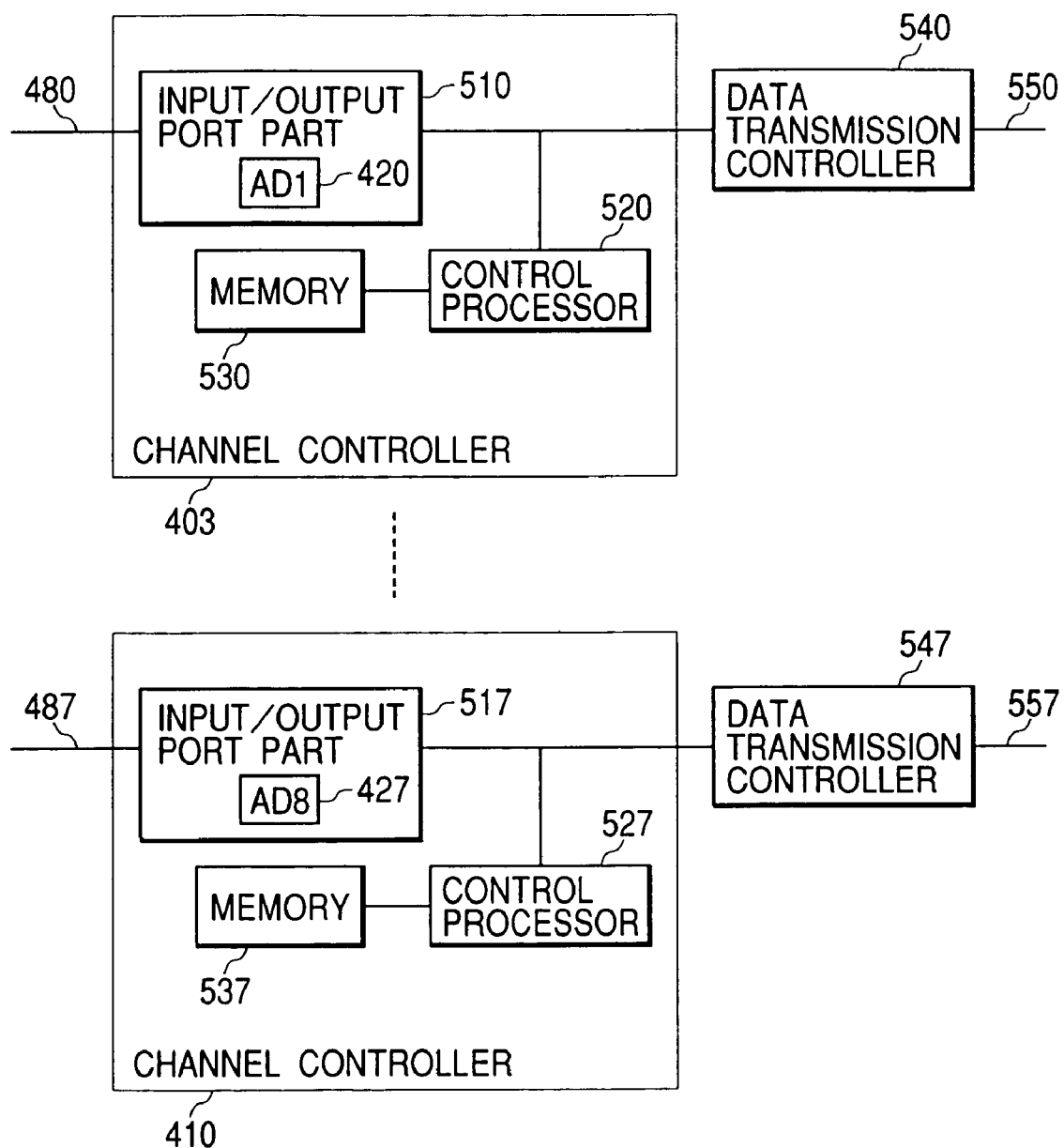
FIG. 2 is a block diagram of a channel controller.

FIG. 2 is a block diagram of a channel controller.

FIG. 3 is a diagram of an address management table.

Because each of the channel controllers 403 to 410 has the same structure, the structure is described with reference to the channel controller 403 shown at the top.

The channel controller 403 comprises an input/output port part 510, a control processor 520, and a memory 530.

The input/output port part 510 receives an access request packet sent from the router 402 through a path 480. The input/output port parts 510 and 517 may be network interface cards, for example. The control processor 520 performs network protocol processing, including analysis of the access request packet received by the input/output port part 510, and generates an access request to the memory controller 490. The control processor 520 enables remote login from external equipment to establish the storage device address. The memory 530 stores a program for controlling data transmission from the input/output port to a data transmission controller 540, and also stores control information and the received packet.

The control processor 520 reads stored packets from the memory 530 and performs network protocol processing. The memory 530 also contains an address management table for managing storage device addresses.

The data transmission controller 540 accepts requests from the control processor 520 and performs control of data transmission to a cache.

The data transmission controller 540 is connected via an internal path 550 to the coupled unit 430.

Figure 6:
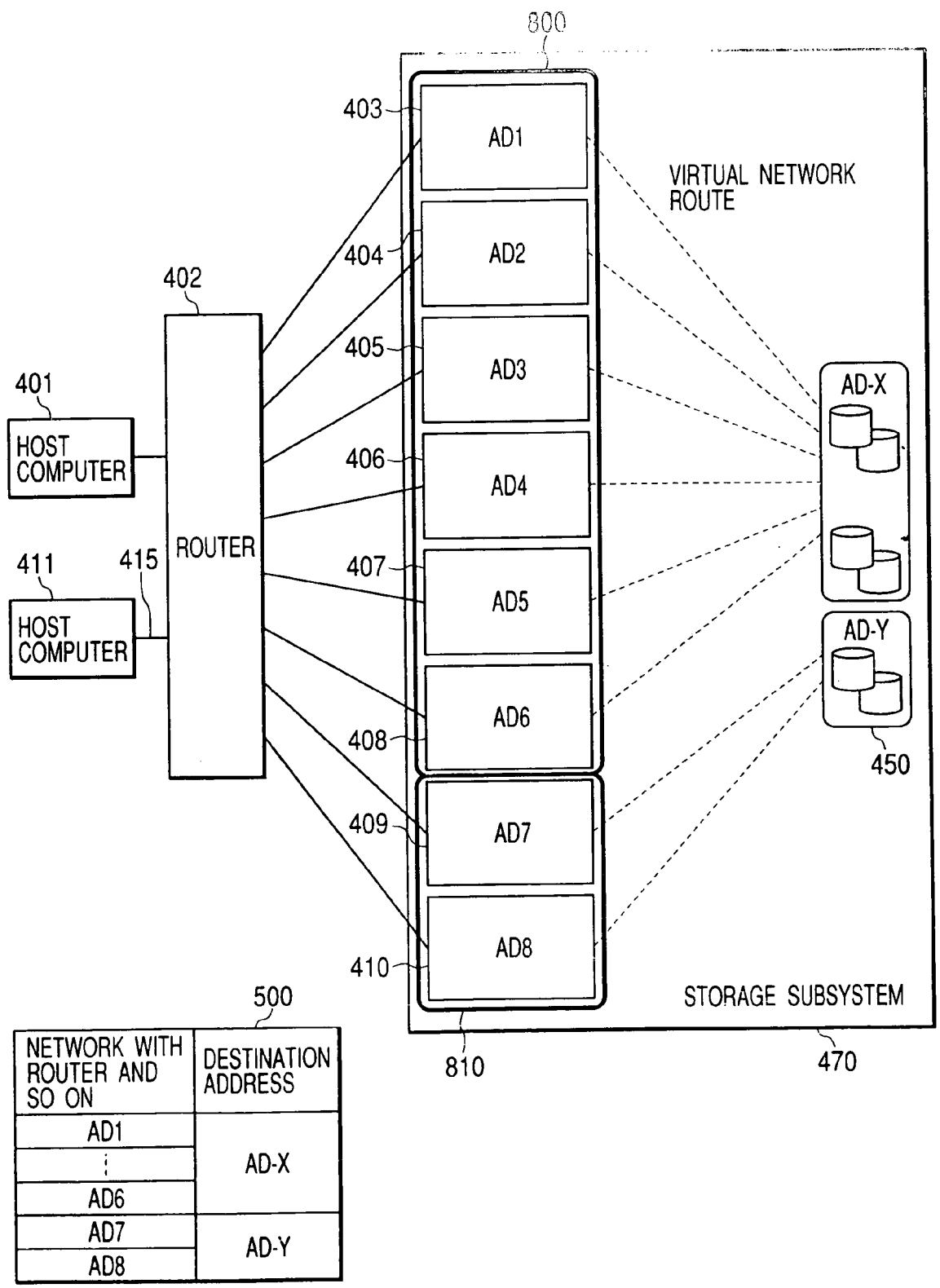
FIG. 6 is a conceptual diagram for describing the communication operations in the storage subsystem of the second embodiment of the invention.
Figure 7:
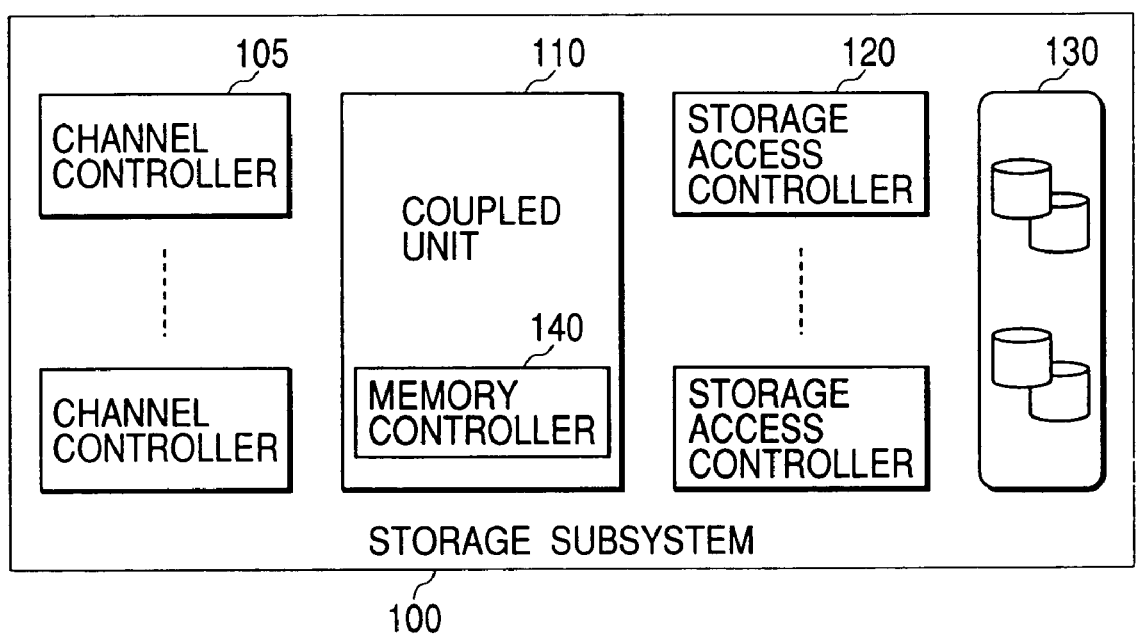
FIG. 7 is a block diagram of a general storage subsystem.
Figure 9A:
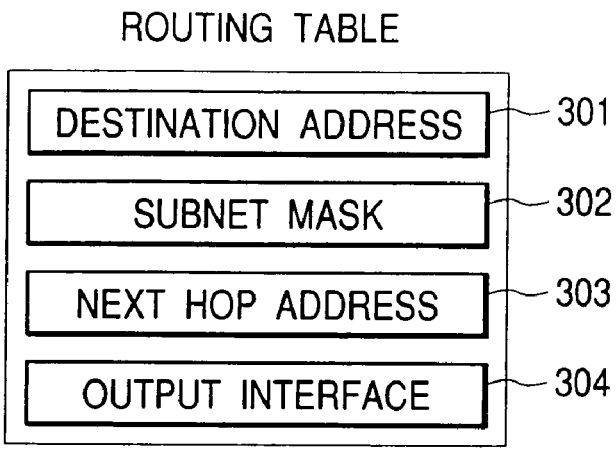
FIG. 9 is a drawing showing routing tables and a table of information of multi-path in a router.
Figure 9B:
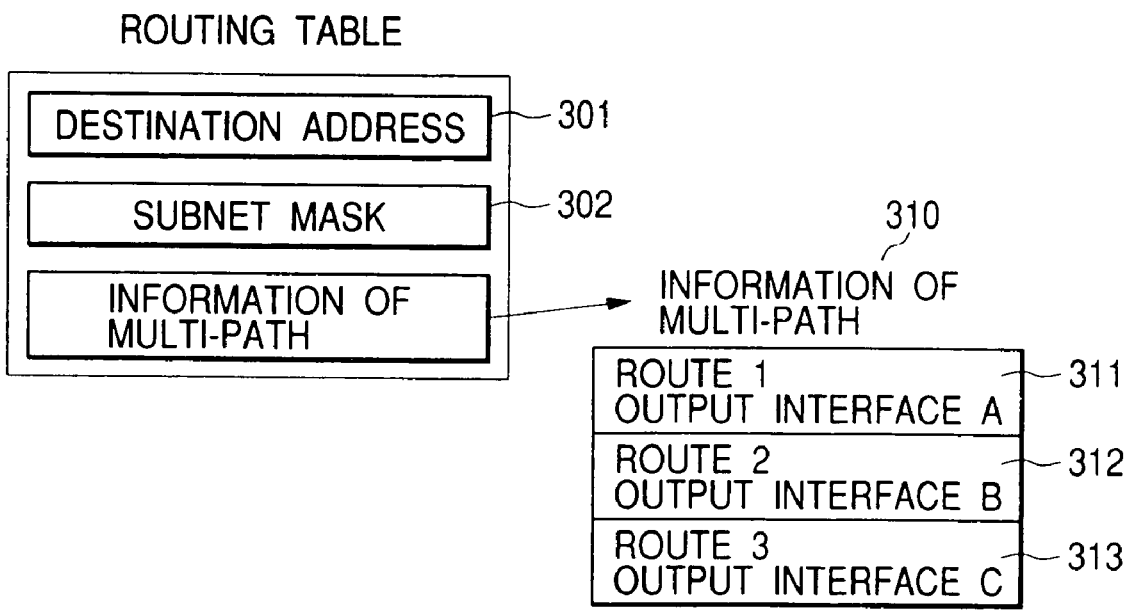

The address management table 630 is stored in the memory 530 within the channel controller 403 in the form shown in FIG. 6.

The address given by the storage device IP address 610 is different from the IP address assigned to the channel controller 403. The channel controller 403 makes the external router 402 believe that there is a device with the storage device IP address. The address given by the storage device MAC address 620 is also different from the MAC address that has been assigned to the channel controller 403.

Next, communication operations ill the storage subsystem of the first embodiment of the invention is described with reference to FIG. 4.

FIG. 4 is a conceptual drawing describing the communication operations in the storage subsystem of the first embodiment of the invention.

The router 402 and the channel controllers 403 to 410 are interconnected with each other via the input/output ports and an access packet is sent from the host computer 401 to access the storage device 460. The access packet designates the address of the storage device 460.

Each of the channel controllers 403 to 410, when it receives a packet sent from the router 402 and the address matches the corresponding storage device address, recognizes it is an access packet to the storage device 460 so as to issue a command to the storage access controller 440 (referring back to FIG. 1) to perform input/output processing.

The channel controllers 403 to 410, jointly or individually, perform a pseudo storage load routing function like a router in balancing the storage load on the storage device 460, receiving a packet and in responding to the router 402 and reporting that there is a network device with address AD-X on its route.

This enables the router 402 to acquire routing information 500, which can be used for transmitting subsequent packets. To the router 402, the channel controllers 403 to 410, jointly or individually, look like a router, which enables optimal packet transmission and balancing the routes for storage. The pseudo storage load routing function enables the channel controllers 403 to 410 to notify the router 402 of current conditions according to a protocol to indicate whether each route connected to the router is available or not. Alternately, the router 402 determines that the corresponding routes are not available due to failure of receiving a response to inquiries within a fixed interval.

The pseudo storage load routing function can be controlled by a value given by the state of pseudo function 630 in the address management table. The value ON indicates that the pseudo router function is activated, and the value OFF indicates that the pseudo router function is not activated. The states ON and OFF can be set by the external address establishing means 495.

Although the example shown in FIG. 3 uses a single storage device address, it is possible to have pseudo router functions with a plurality of storage device addresses.

Second Embodiment

The second embodiment of the invention is described below with reference to FIG. 5 and FIG. 6.

Figure 5:
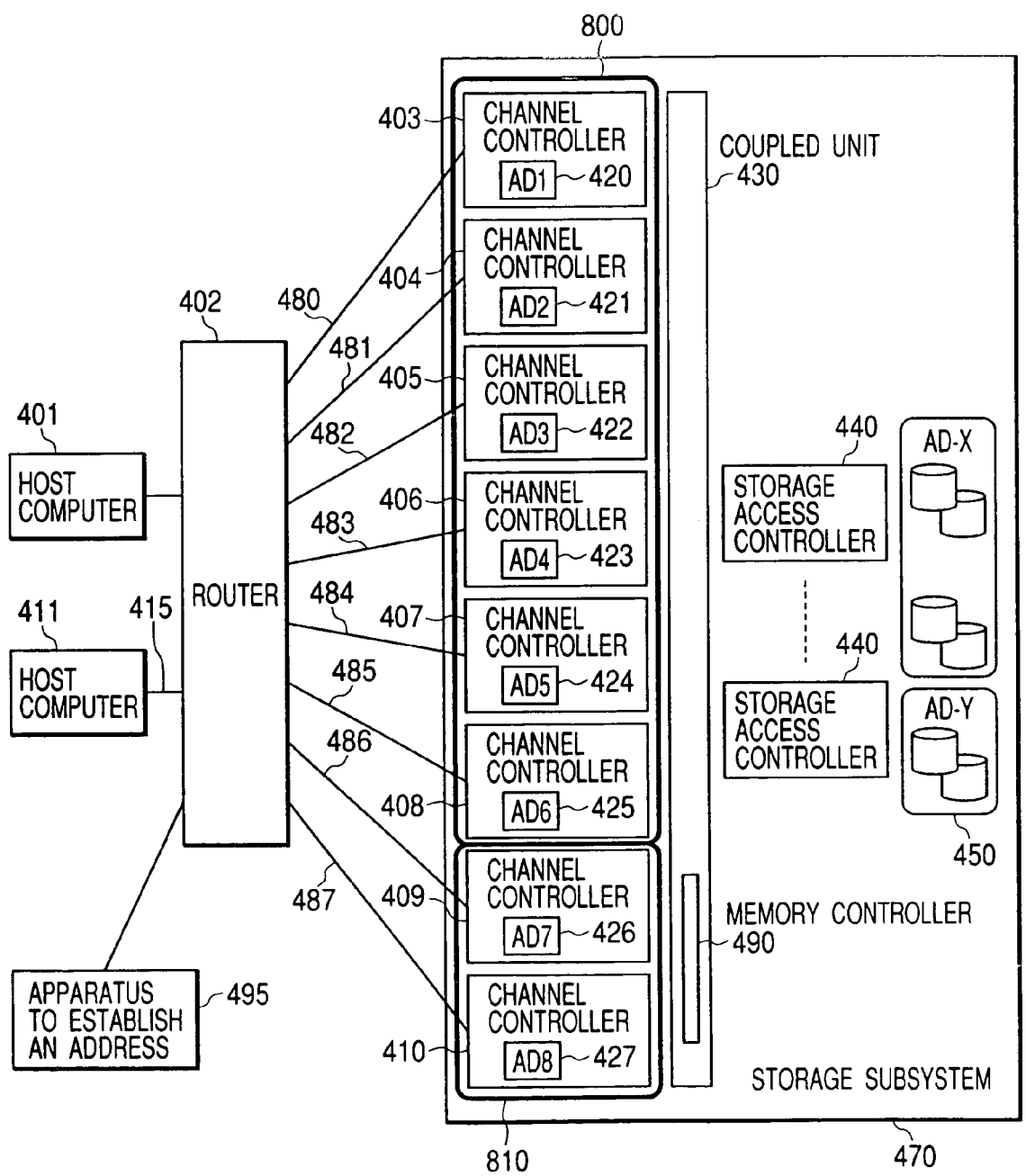
FIG. 5 is a block diagram of a storage subsystem of a second embodiment of the invention.

FIG. 5 is a block diagram of the storage subsystem of the second embodiment of the invention.

FIG. 6 is a conceptual drawing describing communication operations in the storage subsystem of the second embodiment of the invention.

In the first embodiment, the whole storage device 450 in the storage subsystem 470 is assigned with a single storage device address, but in this embodiment, the storage device 450 is assigned with two storage device addresses.

Suppose, as shown in FIG. 5, that two different volume groups in the storage device 450 in the storage subsystem are assigned with different storage device addresses AD-X and AD-Y respectively.

The channel controllers 403 to 408 in the first group 800, jointly or individually, have the storage device address AD-X in the address management table 630, and the channel controllers 409 to 410 in the second group 610, jointly or individually, have the storage device address AD-Y in the address management table 630. The pseudo storage load router, i.e. the channel controller 403–410 jointly or individually, functions behave as if these addresses existed on the corresponding route therethrough, as described above.

The pseudo storage load router generates routing information 500 as shown in FIG. 6 at the router 402, which uses this information for packet transmission.

This enables concurrent access via a network to different volume groups in the storage device 450 from external host computers 401 and 411.

In addition, when more routes are required due to a request from a host computer, it is possible to provide the requested routes by establishing more storage device addresses to be recognized by the channel controllers.

The foregoing invention has been described in terms of preferred embodiments. However, those skilled in the art will recognize that many variations of such embodiments exist. Such variations are intended to be within the scope of the present invention and the appended claims.

What is claimed is:

1. A storage subsystem comprising:
 a plurality of channel controllers connectable to a network;
 a plurality of storage access controllers connectable to said plurality of channel controllers via a coupled unit; and
 a plurality of storage devices connectable to said plurality of storage access controllers,
 wherein one of said plurality of channel controllers has a first network address and a second network address, wherein another one of said plurality of channel controllers has said first network address and a third network address, wherein said one of said plurality of channel controllers and said another one of said plurality of channel controllers respond if receiving a packet including said first network address from said network, and said first network address is assigned to a group of storage devices of said plurality of storage devices.

2. The storage subsystem according to claim 1, wherein said one of said plurality of channel controllers performs input/output processing indicated by the packet and sends request to one of said plurality of storage access controllers to access said group of storage devices assigned with said first network address, wherein said another one of said plurality of channel controllers performs input/output processing indicated by the packet and sends request to said one of said plurality of storage access controllers to access said said group of storage devices assigned with said first network address.

3. The storage subsystem according to claim 2, wherein said plurality of storage devices includes a plurality of volumes, wherein some of said plurality of volumes are assigned to said first network address.

4. The storage subsystem according to claim 3, wherein, if said one of said plurality of channel controllers is not available, said one of said plurality of channel controllers notifies a network device that sends the packet that said one of said plurality of channel controllers is not available.

5. The storage subsystem according to claim 1, wherein a third one of said plurality of channel controllers has a fourth network address and a fifth network address, wherein a fourth one of said plurality of channel controllers has said fourth network address and a sixth network address, wherein said third one of said plurality of channel controllers and said fourth one of said plurality of channel controllers respond if receiving another packet including said fourth network address from said network, and said fourth network address is assigned to another group of storage devices of said plurality of storage devices.

6. The storage subsystem according to claim 5, wherein said third one of said plurality of channel controllers performs input/output processing indicated by the another packet and sends request to another one of said plurality of storage access controllers to access said another group of storage devices assigned with said fourth network address, wherein said fourth one of said plurality of channel controllers performs input/output processing indicated by the another packet and sends request to said another one of said plurality of storage access controllers to access said another group of storage devices assigned said fourth network address.

7. The storage subsystem according to claim 6, wherein another some of said plurality of volumes are assigned to said fourth network address.

8. The storage subsystem according to claim 7, wherein, if said third one of said plurality of channel controllers is not available, said third one of said plurality of channel controllers notifies a network device that sends the another packet that said third one of said plurality of channel controllers is not available.

* * * * *